United States Patent Office 3,423,231
Patented Jan. 21, 1969

3,423,231
MULTILAYER POLYMERIC FILM
Hans Harald Lutzmann, Terre Haute, Ind., assignor to Ethyl Corporation, New York, N.Y., a corporation of Virginia
Filed May 20, 1965, Ser. No. 457,505
U.S. Cl. 117—68.5
Int. Cl. B32b 27/08
12 Claims

ABSTRACT OF THE DISCLOSURE

A composite laminated film including at least one layer each of a polyamide film, an ethylene-acrylic acid copolymer film, and a polyolefin film. Additional layers of other films can be utilized. The ethylene-acrylic acid copolymer film serves to bond the other plies of the laminate securely together.

---

This invention relates to novel composite or multilayer polymeric films and the methods for their manufacture. More particularly this invention relates to multilayer films in which the substrate ply is nylon coated in such a way as to enhance its usefulness in the packaging and allied fields.

It is possible to prepare nylon films having advantageous properties of high strength, toughness and clarity. However, nylon has the drawback of relatively high cost. Moreover nylon films have inadequate sealability characteristics which limit their usefulness for packaging and like applications. Furthermore to achieve high clarity nylon films one cannot use the common blown film extrusion technique because nylon films made in this manner are cloudy.

In an attempt to circumvent these difficulties relatively thin, clear nylon films have been formed by techniques other than the blown film process and one or both sides of the films have been coated with polyethylene. However this approach required the use of polyethylene film whose surface had been treated chemically or physically to improve its bonding properties—otherwise the polyethylene would not adhere to the substrate nylon film. For the purposes of improving the bonding properties of polyethylene film a variety of surface treatments have been proposed. Included among these surface treatments are treating of the surface with sulfuric acid, nitric acid or chromic acid, or with halogens under free radical forming conditions; exposure of the surface to ozone, preferably while at a temperature above 100° C.; exposure of the surface to a high voltage electric stress accompanied by corona discharge in the presence of oxygen; exposure of the surface in the presence of oxygen to ionizing radiations such as ultraviolet, α-, β-, or γ-radiation, X-rays, etc., particularly at temperatures above 100° C.; or exposure of the surface to a flame for a time sufficient to cause superficial oxidation but not long enough to cause distortion of the film. These surface treatments are costly, tedious and oftentimes hazardous.

An object of this invention is to provide composite or laminated nylon films and methods for their manufacture. A more particular object is to provide multi-ply films characterized (1) by having high strength, toughness and clarity, (2) by possessing attractive sealability characteristics, (3) by being producible by a wide variety of film producing techniques such as the blown film extrusion process, (4) by having a firm bond among the laminates even though these include a polyolefinic film, (5) by being producible from polyolefin film whose surface is not subjected to the above-mentioned costly, tedious and hazardous treatments, and (6) by being relatively inexpensive to prepare.

The above and other objects, features, characteristics and advantages of this invention will be apparent from the ensuing description and appended claims.

Figure 1:
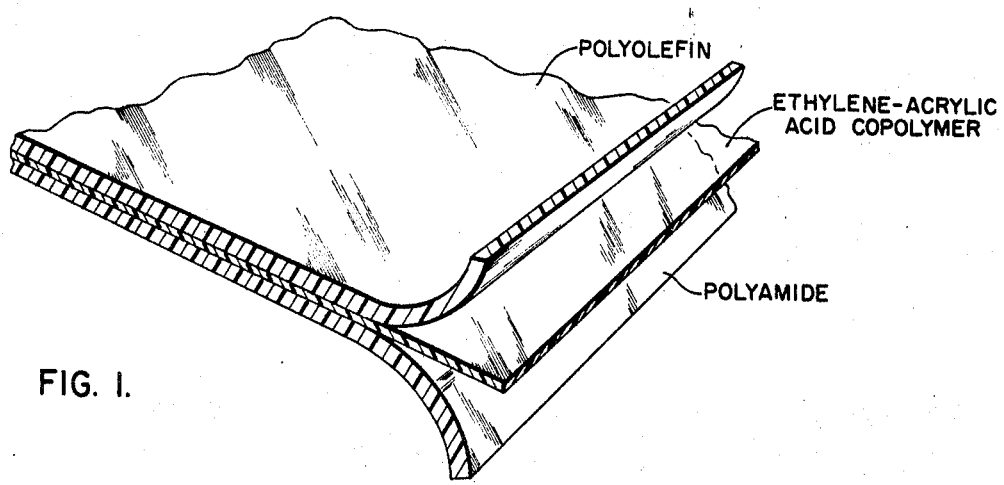
FIG. 1 is a perspective view of a composite film comprising a polyamide film, a bonding layer, and a polyolefin layer.
Figure 2:
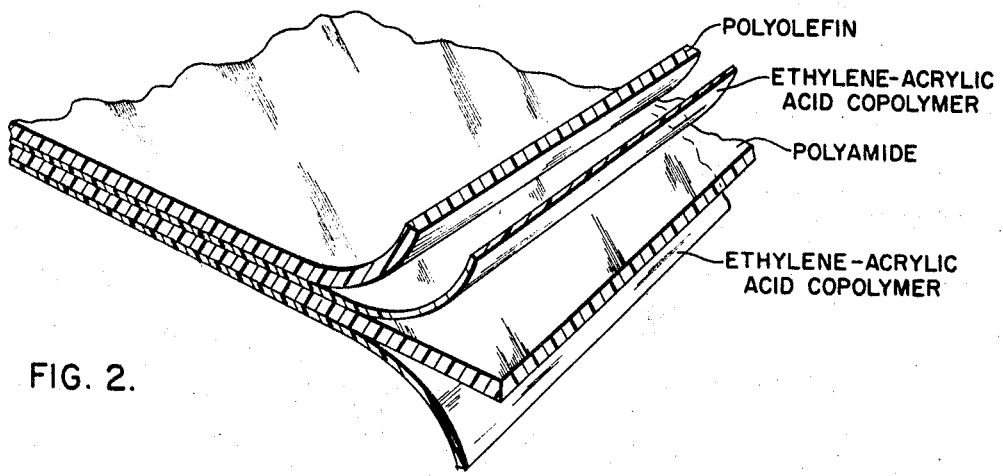
FIG. 2 is a perspective view of a composite film comprising a polyamide film, an ethylene-acrylic acid copolymer layer adhered to both sides thereof and a polyolefin layer adhered to one copolymer layer.
Figure 3:
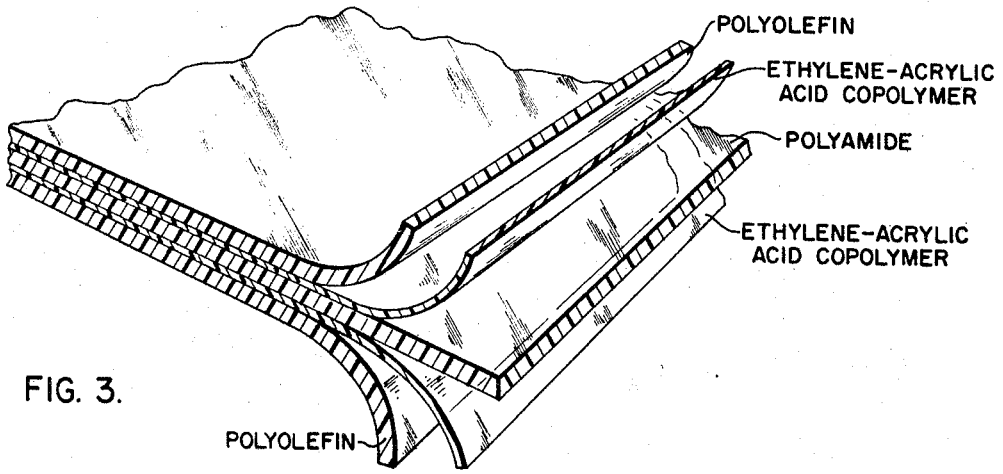
FIG. 3 is a perspective view of a composite film comprising a polyamide film, an ethylene-acrylic acid copolymer layer adhered to both sides thereof and a polyolefin layer adhered to each copolymer layer.

Provided by this invention is a nylon film having affixed to at least one of its surfaces a thin continuous coating of an ethylene-acrylic acid copolymer, said coating in turn having affixed to its surface a thin continuous film of a normally solid polyolefinic hydrocarbon polymer. It will thus be seen that these composite films are formed by providing between a nylon layer and a polyolefinic hydrocarbon layer a thin bonding layer of an ethylene-acrylic acid copolymer. This bonding layer causes the plies of the composite finished film to remain virtually inseparable under normal conditions of handling and use. As will be seen hereinafter a preferred method of this invention involves producing these composite self-supporting films by simultaneously forming (a) a polyamide polymer film, (b) the ethylene-acrylic acid copolymeric adhesive bonding layer to contact with the polyamide polymeric film and (c) a ply of normally solid polyolefinic hydrocarbon polymer in contact with this bonding layer.

The multi-ply films of this invention comprise at least three plies—viz. nylon-to-ethylene-acrylic acid copolymer-to-polyolefin polymer. For many applications it is preferred that the article contain 4- or 5-plies—i.e., both sides of the nylon film are coated with the ethylene-acrylic acid copolymer and one or both of these coatings in turn is in adherent contact with a thin continuous film of the normally solid polyolefinic hydrocarbon polymer. For some applications an even larger number of plies may be employed so long as there is a bonding layer of the ethylene-acrylic acid copolymer between successive plies of nylon and polyolefin film.

The nylon film used in the practice of this invention may be any of the well known category of film-forming polyamide polymers. Thus recourse may be had to the use of such nylons as nylon-6 (polycaproamide); nylon-6,6 (polyhexamethylene adipamide); nylon-6,10; nylon-10; nylon-11 (poly-11-undecanoamide or "Rilsan"); and the like. The preferred nylons for this invention are nylon-6 and nylon-11 as these provide especially useful multilayer films.

A variety of copolymers of acrylic acid and ethylene may be used in the practice of this invention. From the cost effectiveness standpoint excellent bonding between nylon films and polyolefin films is achieved by use of copolymers containing a minor proportion of polymerized acrylic acid, the major proportion being ethylene copolymerized therewith. Especially good results are achieved when the content of chemically combined acrylic acid ranges from about 5 to about 15 percent based on the weight of the ethylene-acrylic acid copolymer. These copolymers can be prepared by methods known to the art and some of these copolymers are available from at least one existing commercial supplier.

The polyolefins used in this invention can be of any well known variety, including homopolymers of aliphatic α-olefins—e.g., those containing up to about 8 carbon atoms in the molecule—and copolymers or interpolymers of such α-olefins. Exemplary of these olefins are ethylene, propylene, butene-1, pentene-1, 3-methyl-butene-1, 4-methylpentene-1, hexene-1, heptene-1, octene-1 and the like. Good results are achieved with such polymers as polypentene-1, polyheptene-1, ethylene-propylene copolymer, ethylene-butene-1 copolymer, propylene-octene-1 copolymer, ethylene-4-methyl-pentene-1 copolymer and the like. The nature of these polyolefin copolymers and methods for their preparation are well known to those skilled in the art and numerous references thereto appear in the literature.

For most purposes polyolefin polymers made from ethylene, propylene and/or butene-1—i.e., the normally gaseous straight chain α-olefins are most suitable, polyethylene and polypropylene serving as examples.

The preferred polyolefinic hydrocarbon polymer is polyethylene as it is the least expensive and provides exceptionally good heat sealability characteristics. It is particularly preferred to utilize low density polyethylene and/or medium density polyethylene. Low density polyethylene has a density in the range of from about 0.910 to about 0.925 gram per cc. whereas medium density polyethylene has a density ranging from about 0.926 to about 0.940. Low density polyethylene and medium density polyethylene are also referred to respectively as "Type I" and "Type II"—see ASTM D-1248-58T. It will be appreciated however that high density polyethylene is also suitable.

The total thickness of the composite films of this invention will ordinarily fall within the range of from about 1 to about 25 mils, the specific thickness being determined mainly by the use to which the self-supporting film is intended to be put and to a lesser extent by the particular method selected for its manufacture. The preferred films of this invention range from about 1 to about 5 mils in thickness as these films are readily producible by the blown film technique. From the standpoint of maximum cost effectiveness and greatest over all packaging utility finished films ranging from about 1 to about 2.5 mils in thickness are most especially preferred.

The nylon film or laminate will usually run in thickness from about 0.2 to about 2 mils although it is entirely feasible to utilize thicker nylon films if it should be desired.

The thickness of the ethylene-acrylic acid copolymeric adhesive layer will likewise vary but ordinarily will range from about 0.05 to about 0.2 mil, typically around 0.075 mil. Again departures from this thickness range are entirely feasible.

The polyolefin film which is formed or affixed on the outer surface(s) of the ethylene-acrylic acid copolymer layer(s) will range in thickness to suit the needs of the occasion. Generally speaking however the ply of polyolefinic hydrocarbon polymer, such as polyethylene, will fall in the range of from about 0.5 to about 5.0 mils in thickness.

The length and width of the films of this invention are dictated by the intended usage to be accorded the finished product. Thus the self-supporting films of this invention may range from narrow tapes to wide sheeting.

To prepare the present films a wide variety of manufacturing techniques may be utilized. For example the individual plies may be prepared or preformed by means of conventional extrusion techniques (e.g., the blown film process, slot die extrusion, etc., the latter being preferred for forming clear nylon film) and then brought together in appropriate arrangement and subjected to pressure by means of press rolls or like equipment. In this way the individual plies are caused to firmly adhere because of the insertion of the copolymer film between successive layers of nylon film and polyolefin film.

A variation of this procedure is to utilize preformed films of nylon and of polyolefin, one or both of these films being treated with a solution or dispersion of the copolymeric adhesive, this treatment being effected by means of any suitable equipment, such as a roll coater. Thereupon the films are subjected to moderately elevated temperature (e.g., 80 to 200° F.) so as to produce a dried film of copolymer on the nylon and/or polyolefin films. In this connection, copolymer solutions may involve use of any suitable inert volatile vehicle such as kerosene, petroleum naphtha, liquid paraffinic hydrocarbons, aromatic hydrocarbon solvents (e.g., toluene, xylene, benzene), ethers, esters, ketones, halogenated hydrocarbons or similar solvents. If a dispersion coating technique is employed the copolymer may be applied in the form of an aqueous dispersion or the like. Thereupon the films are brought into contact with each other so that the copolymer is sandwiched between the nylon and polyolefin films—e.g., by passage through press rolls or the like.

The foregoing operations may be conducted in any suitable sequence provided that the copolymer adhesive is more or less uniformly distributed between successive plies of the nylon film and the polyolefin film, and sufficient temperature and pressure are utilized so as to produce a firmly bonded adherent self-supporting film.

It will therefore be appreciated that any of a wide variety of well known film-forming and lamination techniques may be used to produce the articles of this invention. Numerous teachings are contained in the art on suitable methods, Canadian Patent 699,406 being exemplary of such teachings.

As noted above it is preferable to form the present composites by simultaneously forming the polyamide polymer film, the ethylene-acrylic acid copolymer film layer, and the polyolefinic hydrocarbon polymer layer and further to form these while they are in contact with each other in the order named. This can be readily accomplished by forming 3-ply, 4-ply, 5-ply and like laminates by means of the coaxial extrusion process described in co-pending application. Ser. No. 191,230, filed Apr. 30, 1962, now Patent 3,223,761, all disclosure of which is incorporated herein by the foregoing reference. This outstanding procedure produces an integrally formed multi-ply film in a single continuous operation and dispenses with the need for auxiliary coating operations and the like.

It will be appreciated that the outer polyolefin layer may be further treated so as to render its surface suitable for the application of printing inks or the like. Although any of the above-mentioned prior art surface treatments (e.g., flame treatment, electric stress accompanied by corona discharge, etc.) may be used it is preferable to superimpose onto the exposed polyolefin surface a thin continuous film of the ethylene-acrylic acid copolymer as this serves as an excellent means of improving the anchorage characteristics of the overall composite film.

To illustrate the practice and advantages of this invention typical films of this invention were prepared and measurements made of their pertinent physical characteristics. More particularly, the objects of this invention were accomplished by separately heating the thermoplastic materials by means of conventional melt extruders, each extruder feeding its melted thermoplastic material into a coaxial adapter as described in copending application, Ser. No. 191,230, now patent 3,223,761, discharging the composite, concentric cylindrical solid stream of plastic into an annular die assembly having a mandrel axially piercing and radially distributing the cylindrical stream into a tubular stream to form a continuous seamless tubing. The desired thickness of the tubing was obtained by regulating the melt throughput from the extruders, the opening in the die lips, the speed of haul-off, and the orientation of the blown tubing bubble. The tubing was then passed through a cooling atmosphere which was air (but which may be other suitable heat transfer media).

EXAMPLE I

A self-supporting tubular multilayer film having a nominal 0.001 inch thickness was prepared by simultaneously extruding a film grade polyamide polymer through a conventional extruder while extruding a low density polyethylene through a second conventional extruder and concurrently extruding an ethylene-acrylic acid copolymer between these layers. The particular extrusion conditions used were as follows:

Extruder (Polyethylene)

| | |
|---|---|
| Barrel Dia., inches | 2½ |
| Screw, r.p.m. | 36 |
| Barrel Temp. Sect. 1, ° F. | 380 |
| Barrel Temp. Sect. 2, ° F. | 387 |
| Barrel Temp. Sect. 3, ° F. | 402 |
| Plastic melt temp., ° F. | 400 |

Extruder (Ethylene-Acrylic Acid Copolymer)

| | |
|---|---|
| Barrel Dia., inches | 1½ |
| Screw, r.p.m. | 40 |
| Barrel Temp. Sect. 1, ° F. | 450 |
| Barrel Temp. Sect. 2, ° F. | 425 |
| Barrel Temp. Sect. 3, ° F. | 425 |
| Plastic melt temp., ° F. | 380 |

Extruder (Polyamide)

| | |
|---|---|
| Barrel Dia., inches | 3½ |
| Screw, r.p.m. | 15 |
| Barrel Temp. Sect. 1, ° F. | 500 |
| Barrel Temp. Sect. 2, ° F. | 500 |
| Barrel Temp. Sect. 3, ° F. | 530 |
| Plastic melt temp., ° F. | 530 |

Typical physical properties of the above film were as follows:

| | |
|---|---|
| Thickness | 0.001 inch. |
| Tensile Strength MD | 4363 p.s.i. per ASTM D882–61T, Method A. |
| Tensile Strength TD | 3740 p.s.i. per ASTM D882–61T, Method A. |
| Haze | 5.5% per ASTM D–1003–61, Procedure A. |
| Impact | 430 grams per ASTM D–1709–62T, Method B. |

EXAMPLE II

A five layer self-supporting tubular multilayer film having a nominal 0.003 inch thickness was prepared by simultaneously extruding a film grade polyamide polymer substrate coated on both sides with acrylic acid and low density polyethylene using the apparatus described in copending patent application Ser. No. 191,230, now Patent 3,223,761. The particular extrusion conditions used were as follows:

Extruder (Polyethylene)

| | |
|---|---|
| Barrel Dia., inches | 2½ |
| Screw, r.p.m. | 69 |
| Barrel Temp. Sect. 1, ° F. | 366 |
| Barrel Temp. Sect. 2, ° F. | 384 |
| Barrel Temp. Sect. 3, ° F. | 395 |

Extruder (Ethylene-Acrylic Acid Copolymer)

| | |
|---|---|
| Barrel Dia., inches | 1½ |
| Screw, r.p.m. | 50 |
| Barrel Temp. Sect. 1, ° F. | 480 |
| Barrel Temp. Sect. 2, ° F. | 450 |
| Barrel Temp. Sect. 3, ° F. | 480 |
| Melt pressure, p.s.i. | 2800 |

Extruder (Polyamide)

| | |
|---|---|
| Barrel Dia., inches | 2½ |
| Screw, r.p.m. | 25 |
| Barrel Temp. Sect. 1, ° F. | 475 |
| Barrel Temp. Sect. 2, ° F. | 540 |
| Barrel Temp. Sect. 3, ° F. | 500 |
| Melt pressure, p.s.i. | 3000 |

Typical physical properties of the resultant film were as follows:

| | |
|---|---|
| Thickness | 0.003 inch. |
| Tensile Strength MD | 4620 p.s.i. per ASTM D882–61T, Method A. |
| Tensile Strength TD | 4333 p.s.i. per ASTM D882–61T, Method A. |
| Haze | 9.1% per ASTM D1003–61, Procedure A. |
| Impact | 698 grams per ASTM D1709–62T, Method B. |

What is claimed is:

1. A film of a polyamide polymer having affixed to at least one of its surfaces a thin continuous coating of an ethylene-acrylic acid copolymer containing from about 5 to about 15 weight percent of acrylic acid, said coating in turn having affixed to its surface a thin continuous film of a normally solid polyolefinic hydrocarbon polymer.

2. The article of claim 1 wherein said polyolefinic hydrocarbon polymer is polyethylene.

3. The article of claim 1 wherein said polyolefinic hydrocarbon polymer is polyethylene having a density ranging from about 0.910 to about 0.940 gram per cc.

4. The article of claim 1 wherein said polyamide polymer is selected from the group consisting of polycaproamide and poly-11-undecanoamide.

5. A film of a polyamide polymer having affixed to both of its flat surfaces a thin continuous coating of an ethylene-acrylic acid copolymer containing from about 5 to about 15 weight percent of acrylic acid, the balance being ethylene copolymerized therewith, at least one of said coatings in turn having affixed to its surface a thin continuous film of a normally solid polyolefinic hydrocarbon polymer.

6. The article of claim 5 wherein said polyolefinic hydrocarbon polymer is polyethylene.

7. The article of claim 5 wherein said polyamide polymer is selected from the group consisting of polycaproamide and poly-11-undecanoamide.

8. The article of claim 5 wherein said polyamide polymer is selected from the group consisting of polycaproamide and poly-11-undecanoamide and wherein said polyolefinic hydrocarbon polymer is polyethylene.

9. A film of a polyamide polymer having affixed to both of its flat surfaces a thin continuous coating of an ethylene-acrylic acid copolymer containing from about 5 to about 15 weight percent of acrylic acid, the balance being ethylene copolymerized therewith, both of said coatings in turn having affixed to their respective outer surfaces a thin continuous film of a normally solid polyolefin hydrocarbon polymer.

10. The article of claim 9 wherein said polyolefinic hydrocarbon polymer is polyethylene.

11. The article of claim 9 wherein said polyamide polymer is selected from the group consisting of polycaproamide and poly-11-undecanoamide.

12. The article of claim 9 wherein said polyamide polymer is selected from the group consisting of polycaproamide and poly-11-undecanoamide and wherein said polyolefinic hydrocarbon polymer is polyethylene.

References Cited

UNITED STATES PATENTS

| | | | |
|---|---|---|---|
| 3,223,761 | 12/1965 | Raley | 264—95 |
| 3,228,793 | 1/1966 | Stemmer et al. | 117—138.8 |
| 3,355,319 | 11/1967 | Rees | 117—122 |

WILLIAM D. MARTIN, *Primary Examiner.*

R. HUSACK, *Assistant Examiner.*

U.S. Cl. X.R.

161—227, 254; 117—76, 122, 138.8, 161

Notice of Adverse Decision In Interference

In Interference No. 97,404 involving Patent No. 3,423,231, H. H. Lutzmann, MULTILAYER POLYMERIC FILM, final judgment adverse to the patentee was rendered Nov. 22, 1972, as to claims 1, 2, 3 and 4.

[*Official Gazette January 16, 1973.*]